June 29, 1943.  C. M. CONRADSON  2,323,010
MACHINE TOOL ATTACHMENT
Filed Jan. 29, 1940  5 Sheets-Sheet 1
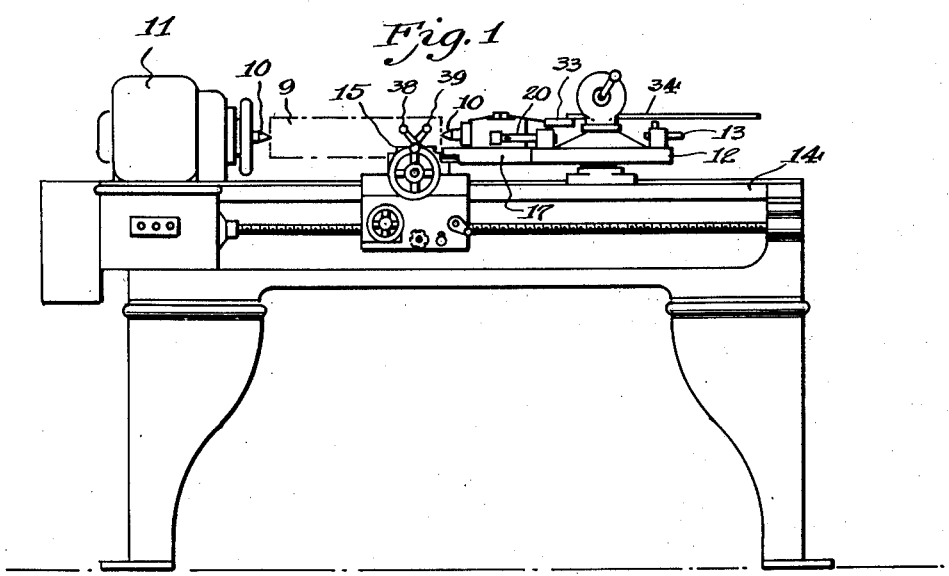
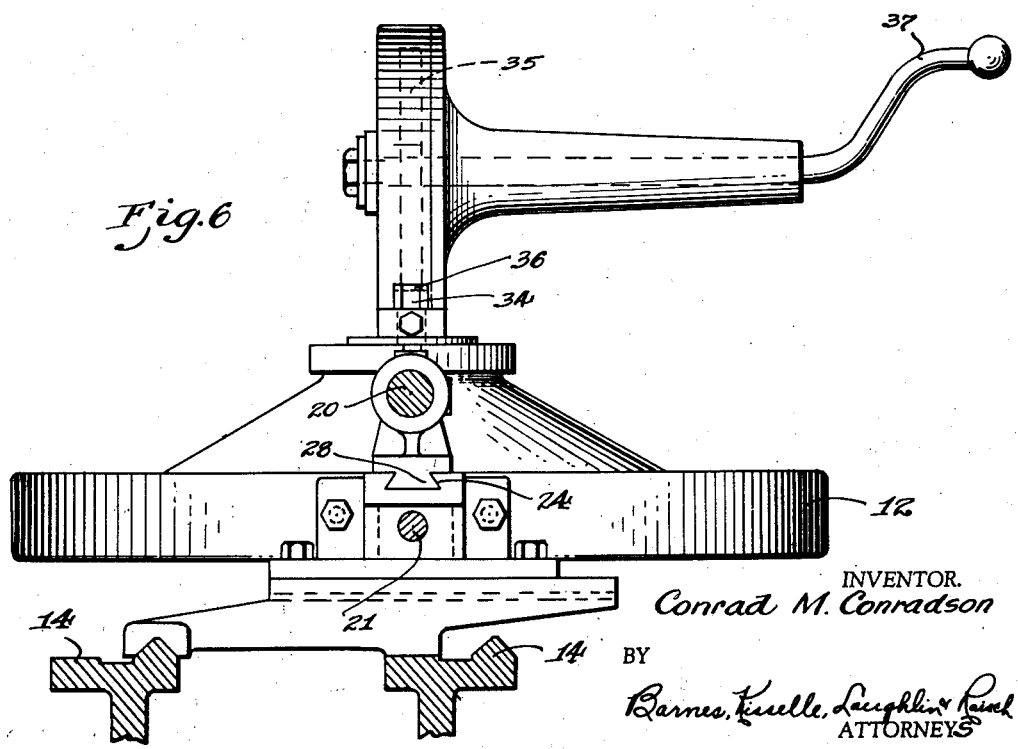
INVENTOR.
Conrad M. Conradson
BY
Barnes, Kisselle, Laughlin & Raisch
ATTORNEYS

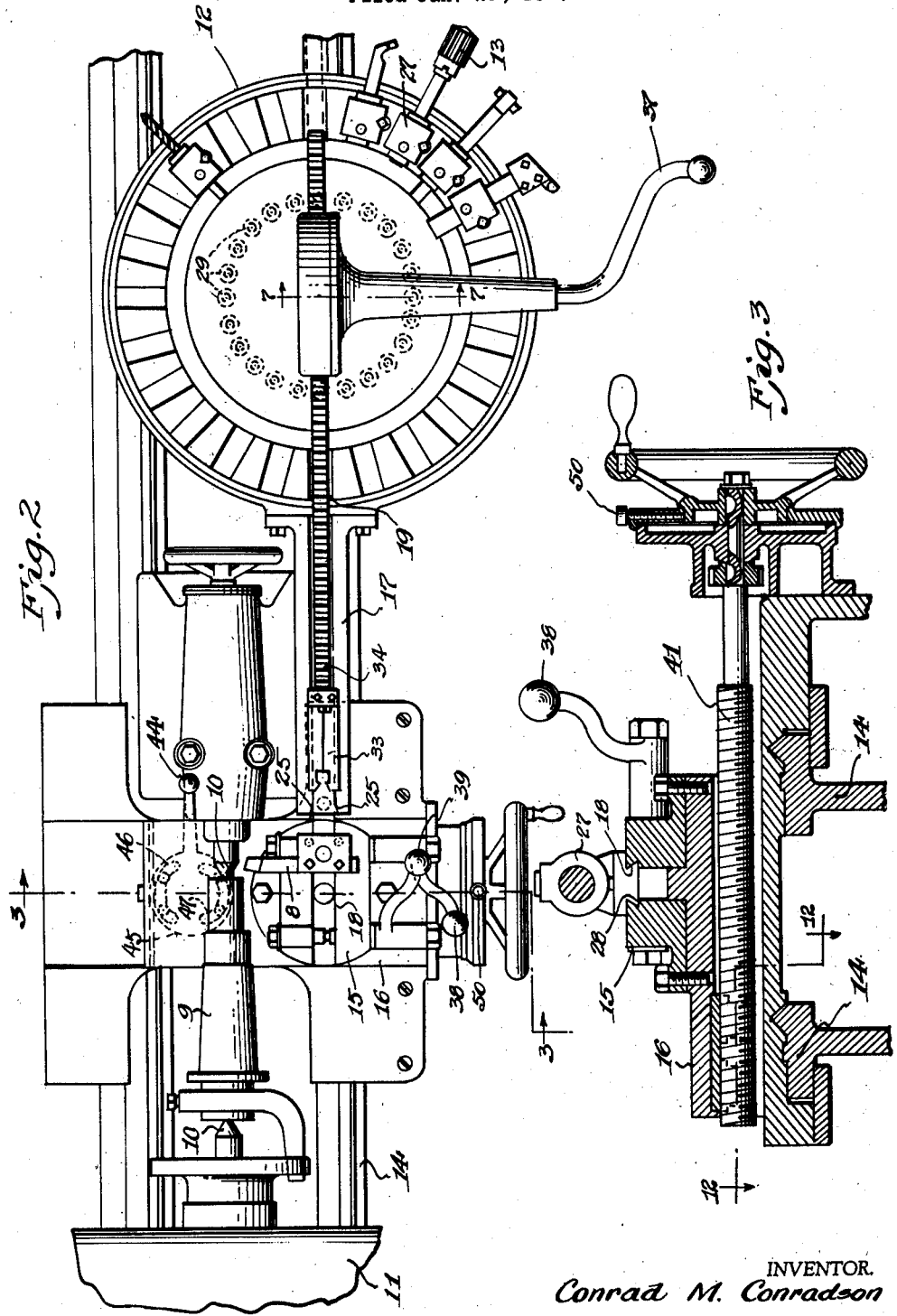

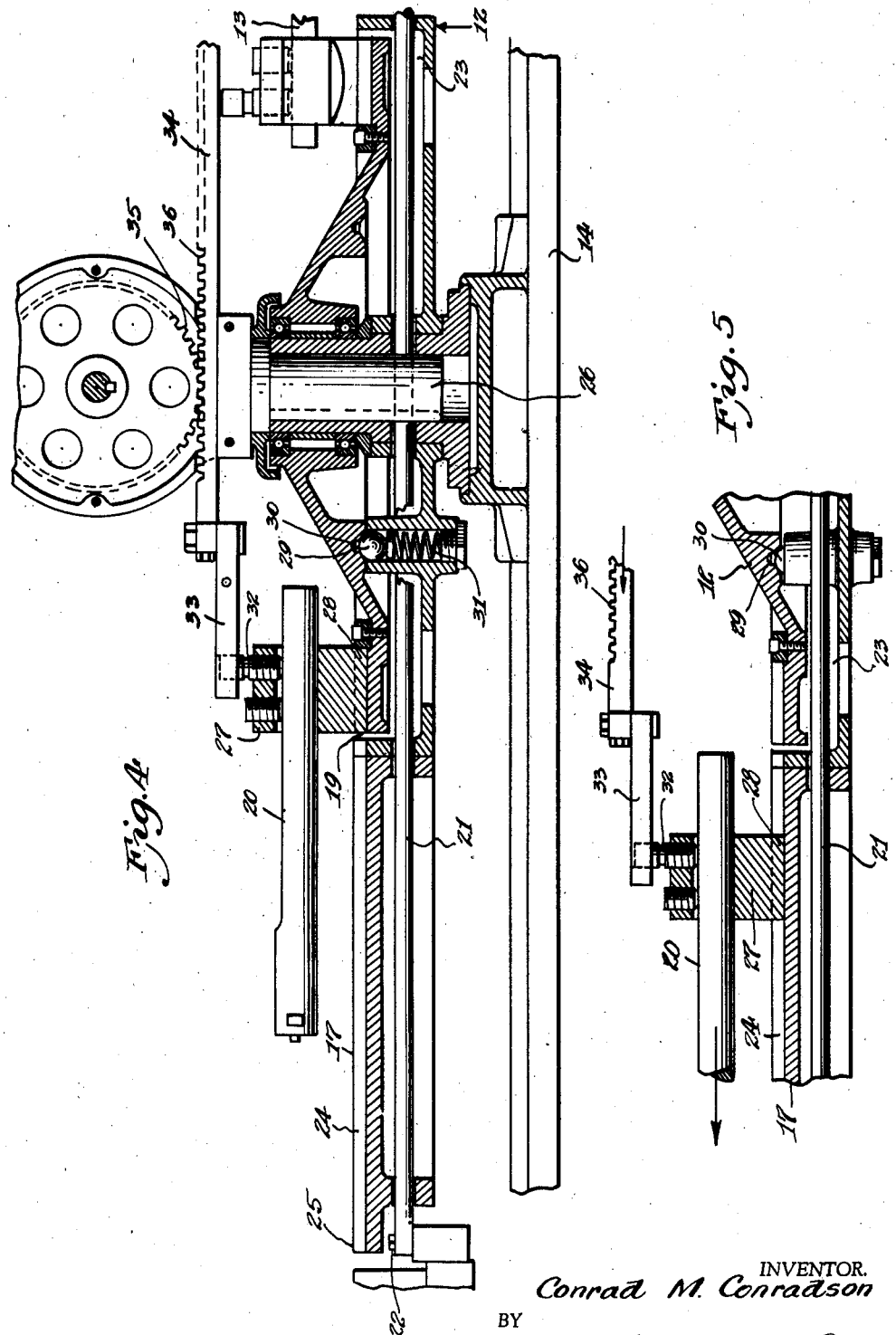

June 29, 1943. C. M. CONRADSON 2,323,010
MACHINE TOOL ATTACHMENT
Filed Jan. 29, 1940 5 Sheets-Sheet 4
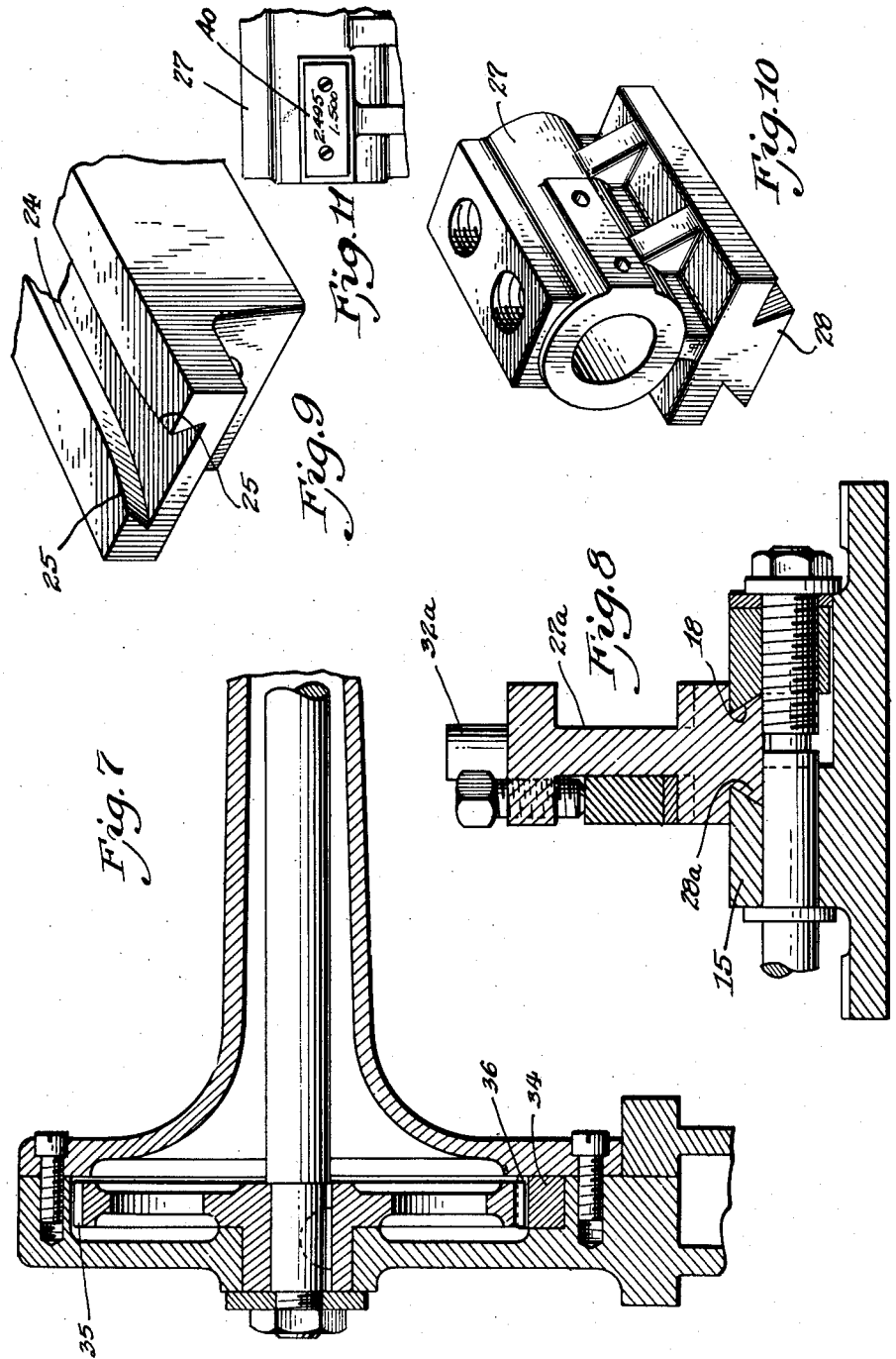
INVENTOR.
Conrad M. Conradson
BY
Barnes, Kisselle, Laughlin & Raisch
ATTORNEYS

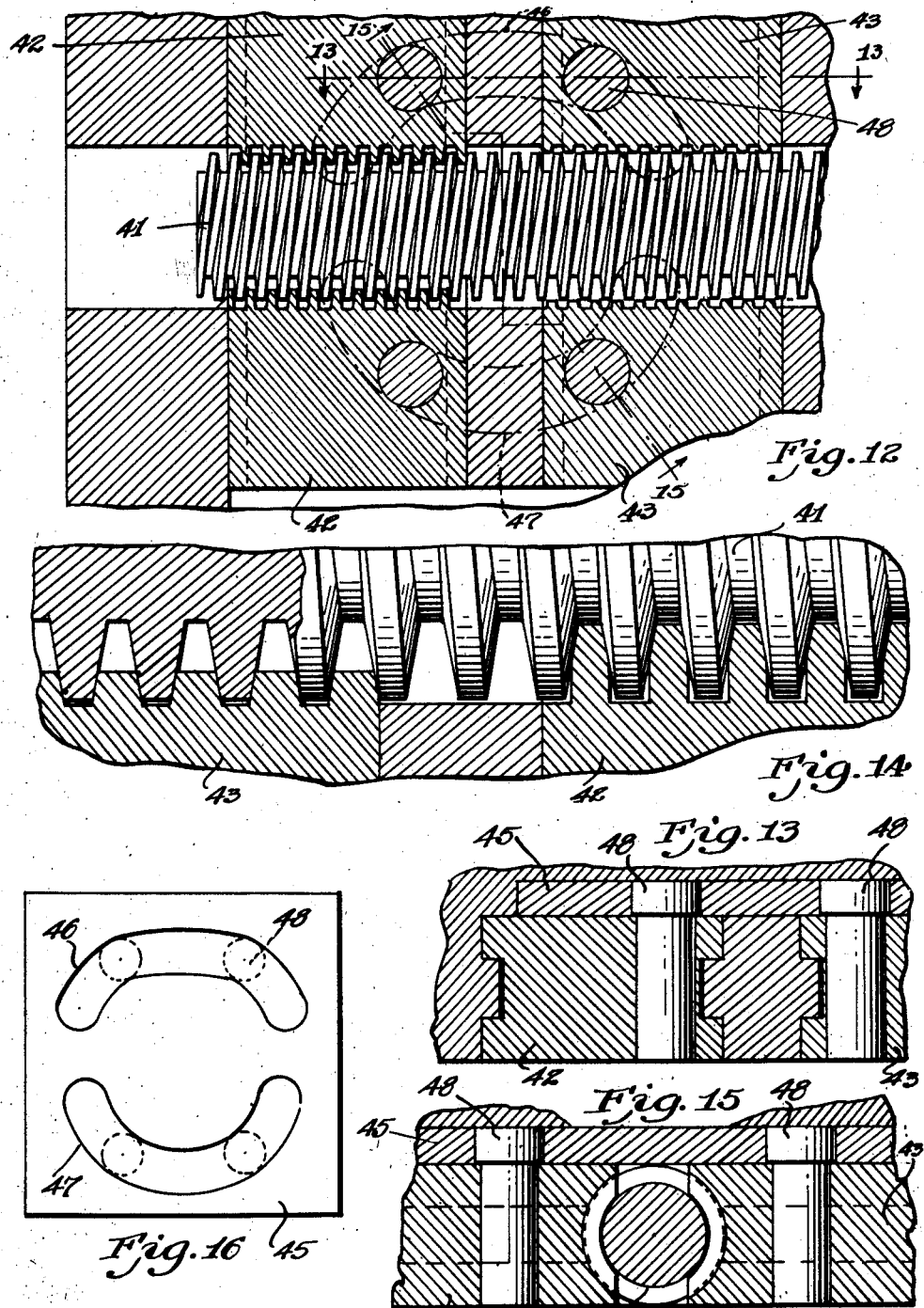

Patented June 29, 1943

2,323,010

UNITED STATES PATENT OFFICE 2,323,010

MACHINE TOOL ATTACHMENT

Conrad M. Conradson, Detroit, Mich.; Frederick R. Walter, administrator of said Conrad M. Conradson, deceased, assignor, by mesne assignments, to Oscar Christianson, Madison, Wis., as trustee Application January 29, 1940, Serial No. 316,136

15 Claims. (Cl. 29—27)

My invention relates to improvements in machine tool attachments.

An important object of the invention is to provide a multiple tool carrier and means to quickly select and insert the tool in working position. A further object of the invention is to provide means whereby each tool is labelled to show its cutting size as related to the micrometer screw.

A further object of the invention is to provide a micrometer measuring screw that will retain its accuracy because not used for feeding or traversing.

A further object of the invention is to provide a device of the character described which will operate with tools of the various types which operate on work held in the lathe chuck and work held on centers. The attachment is equally adapted for boring, drilling, facing, turning, thread cutting and other types of tools.

A further object of the invention is to provide an attachment for a lathe which will very materially reduce the time necessary to turn out a given quantity of finished pieces both in small lots and production work. This is accomplished by having all tools immediately available with the necessary micrometer setting known. In quantity production, a whole lot may be finished without re-setting the tool to good cutting position, taking any trial cuts, or re-measuring for size upon the change of tools.

A further object of the invention is to provide a device of the character described which may be attached to any lathe.

Other objects and advantages of my invention will appear from the description below.

In the accompanying drawings, forming a part of this specification,

Fig. 1 is a side view of a lathe equipped with my invention.

Fig. 2 is a localized top view of the invention and its relation to adjacent lathe parts.

Fig. 3 is a cross-section view along part of the line 3—3 of Fig. 2 but with a different tool in the tool clamp.

Fig. 4 is a cross-section view of the tool carrier and transfer track.

Fig. 5 shows a portion of Fig. 4 with the tool in progress in the transfer track.

Fig. 6 is an end view of the tool carrier and ejecting means.

Fig. 7 is a cross-section of the pinion gear and its mounting on the line 7—7 of Fig. 2.

Fig. 8 is a cross-section of a modified type of tool holder shown in the tool clamp.

Fig. 9 is a perspective view showing the curved ends on the dovetail grooves of the transfer track adjacent the tool clamp.

Fig. 10 is a perspective view of a tool holder.

Fig. 11 is a fragmentary view of the tool holder of Fig. 10 showing the index card placed thereon.

Fig. 12 is a horizontal sectional view showing the cam means of actuating the feeding and adjusting nuts.

Fig. 13 is a vertical section along the line 13—13 of Fig. 12.

Fig. 14 is a detail view of the micrometer screw and adjusting and feeding nuts.

Fig. 15 is a vertical section along the lines 15—15 of Fig. 12.

Fig. 16 is a detail of the cam plate 45 of Fig. 2.

In illustrating the various embodiments of the present invention, I have shown the attachment placed on an engine lathe, but it will be distinctly understood that it may be used on any machine tool desired, such as a turret lathe, a screw machine, planer, shaper, slotter, key seater, broaching machine and the like.

Fig. 1 illustrates a lathe equipped with my attachment. Work 9 is held between centers 10, one of which is driven by a motor 11. A rotatable tool carrier 12, a transfer track 17, and a gear rack 34 are parts of the attachment which may be seen in Fig. 1. The details of the attachment are better illustrated in Fig. 2 which is a localized view of the attachment and its relation to adjacent lathe parts in particular work 9, lathe centers 10, and cross slide 16. It will be observed that tool 8 is in position to begin work, being held in a tool clamp 15.

A rotatable tool carrier 12, carrying a plurality of tools 13, is suitably mounted on the lathe bed 14. The tool carrier in this embodiment carries twenty-four tools but it could be designed to accommodate any number of tools. The tool carrier illustrated is a horizontal circular casting pivotally mounted on an axis 26. Radially spaced around the margin of its circumference are dovetail grooves adapted to engage the dovetail grooves 28 of individual tools as 13. An alternative form of tool holder would be a clip containing the tools and movable in one plane in a direction angular to the transfer track 17.

The lathe itself is, of course, equipped with a tool clamp 15 mounted on a cross slide 16. In the invention a transfer track 17 is aligned with the track 18 of the tool clamp 15 and with the position 19 of the selected tool 20 in the tool carrier 12. A bar 21 is pivotally fastened at 22 to the tool clamp and slidably projects through a channel 23 in the base of the transfer track and the base of the tool carrier. The dovetail grooves 24 in the transfer track 17 are curved outwardly at 25 adjacent the tool holder. Thus, movement of the tool clamp on the cross slide will cause the bar 21 to pivot slightly on its connection 22 with the tool clamp. The bar may slide in its channel 23 so that movement of the tool clamp on the cross slide will cause the transfer track and tool carrier to rotate slightly about the axis 26 of the tool carrier but to remain perfectly aligned. The dovetail grooves 18 in the tool clamp then assume a slight angle with the transfer track but this does not impair the operation of the ejector for the curved ends 25 of the dovetail grooves in the transfer track permit the tool to be easily forced around this slight curve. The bar 21 serves another purpose. When it is desired to move the tool clamp lengthwise of the lathe bed the bar may slide in the channels and allow such movement.

Each tool 13 is equipped with a tool holder 27 which has a dovetail base 28 adapted to motion in the transfer track, tool clamp, and tool carrier, as illustrated by Fig. 10. Fig. 8 shows another form of tool holder 27a with a dovetail base 28a.

The rotatable tool carrier 12 is provided with means which cause it conveniently to stop rotating when the desired tool holder 27 is in exact alignment with the transfer track 17. One method to provide for this is illustrated in the drawings. Conical recesses 29 are provided in alignment with the radii of the tool carrier which coincide with the tool positions. One or more depressable steel balls 30 are mounted so as to be forced into the conical recesses by a spring 31 as the carrier is rotated. Thus rotation of the carrier may be conveniently stopped when the selected tool is in exact alignment with the transfer track.

The invention includes a means of ejecting the desired tool from the carrier and placing it in the tool clamp in exactly the proper position for work and returning it after the work is done. To this end each tool holder 27 is provided with a pin 32 preferably vertical. In tool holder 27a of Fig. 8, the pin is labelled 32a. A crabclaw 33 is positioned so that it may engage this pin 32. The crabclaw is mounted longitudinally on one end of a slidable gear rack 34. A pinion 35 rotatably mounted, engages the teeth 36 of the rack 34. The pinion is provided with a crank handle 37. The rack is so positioned that at one extreme position the crabclaw 33 is within the radius of the circular carrier. At the other extreme position the crabclaw and rack are extended toward the tool clamp so that the tool is in proper position therein.

Crank handles 38 and 39 serve to clamp the tool holder in the tool clamp. Hydraulic means could be employed to actuate this tool clamp or the rack and pinion if desired.

A new method of indexing is employed in connection with this attachment. Each tool or tool holder is provided with a cardboard index 40 fastened thereto. On this index will be written the micrometer setting necessary to effect a basic standard operation of the tool. From this the operator may readily compute the micrometer setting necessary to effect his particular operation. For example, it is desired to turn a diameter of 1.50 inches on the stock. A trial cut is taken and the diameter of the stock is found to be 2.25 inches. Then 2.25 inches less 1.50 inches or .75 inch is the difference in diameters and one-half of this is the amount of stock to be removed, or 0.375 inch. The micrometer reading happens to be 2.870. Subtract 0.375 from 2.870 which equals 2.495 and this difference is the micrometer setting necessary to turn the desired diameter of 1.50 inches. This may be marked on the index, i. e., 2.495 micrometer setting will turn 1.50 inches. This constitutes the index number referred to herein. Obviously now any other diameter can be turned directly and no trial cuts or measuring are necessary. Thus suppose a diameter of 1.75 is now desired. 1.75 inches less 1.50 inches (index) equals 0.25 inch. Add half of 0.25 to the micrometer index of 2.495 equals 2.620 and this setting of the micrometer will turn the desired diameter of 1.75. Note that once the index number had been computed it was not necessary to measure the outside diameter of the stock, etc.

In production work where the work is to duplicate many pieces it is possible to use the arrangement to an even greater time saving advantage. This may be accomplished by pre-adjusting the tools in their tool holders so that one common micrometer setting will cause each preadjusted tool to perform its work. Obviously then the operator need not even look at the index numbers or change the micrometer while the entire lot is run off. His only function would be to change the tools and operate the lathe with the micrometer at a constant setting.

The ordinary micrometer screw as fitted to lathes, milling machines, etc., is used for traversing or feeding the tool holder or work holder, and rapidly wears and loses its accuracy. My invention includes a new micrometer screw arrangement. The screw 41 may mesh in the alternative with different pairs of threaded blocks 42 and 43. One pair of threaded blocks 42 is used for feeding or traversing and the other pair 43, is made with great accuracy and used for measuring only. These pairs of threaded blocks are so positioned that movement of the feed nut lever 44 will rotate cam plate 45. The cam grooves 46 and 47 are cut with a curve that causes the blocks to be alternately engaged in pairs. Pin 48 on each block engages the cam groove. An alternative construction is to have the threads superimposed upon each other on one set of threaded blocks. Fig. 14 shows one construction in detail. The precision nut 43 has very short teeth while the feeding nut 42 has very long teeth. Thus the wear from feeding will not affect the accuracy of the measuring threads. For purposes of illustration both feeding nut 42 and adjusting nut 43 are shown in engaged position although it is evident that this does not occur simultaneously during operation of the actual device.

The operation of the device is as follows:

The work 9 is placed in the lathe. The desired tool is selected and the carrier rotated until the tool is aligned with the transfer track 17. Handle 37 is turned in a clockwise direction. This rotates pinion 35, the teeth of which engage gear rack 34 and force it towards the tool clamp 15. Crabclaw 33 engages pin 32 on the tool holder and the tool is thus ejected from the holder and forced along the transfer track 17 into position in the tool clamp 15. Lever handles 38 and 39 are rotated to fasten the tool and tool holder rigidly in the clamp. From the index number 40 of the tool holder, the necessary micrometer 50 setting is computed and the micrometer so set. The feed nut lever 44 is moved to release the adjusting micrometer nut 43 and engage the feeding nut 42. The work is then performed. Lever handles 38 and 39 release the clamp. Handle 37 is turned and the crabclaw 33 engages the tool holder and, on turning the handle 37 in the other direction, the rack retreads and the tool and holder are returned to the tool carrier.

I claim:

1. In a machine tool attachment, a rotatable tool carrier, a plurality of tools placed within the carrier, a stationary transfer track fastened in line with a portion of the carrier, a tool clamp to hold the tool in working position in alignment with the transfer track, means adapted to engage a portion of said tool, and a second means for shifting said first means and the tool on the transfer track to and from the tool clamp.

2. In a machine tool attachment, a rotatable tool carrier, a plurality of tool holders placed within the carrier, a plurality of tools placed within the tool holders, a transfer track rotatably fastened in line with a portion of the carrier, a tool clamp to hold the tool in working position in alignment with the transfer track, means adapted to engage a portion of said tool holder, and a second means for shifting said first means and the tool on the transfer track to and from the tool clamp.

3. In a machine tool attachment, a rotatable tool carrier, a plurality of tool holders placed within the carrier, a plurality of tools placed within the tool holders, a transfer track fastened in line with a portion of the circular holder, a tool clamp to hold the tool in working position in alignment with the transfer track, means adapted to engage a portion of said tool holder, and gear means for moving said first means and tool on the transfer track to and from the tool clamp.

4. In a machine tool attachment, a movable tool carrier, a plurality of tool holders placed within the carrier, a plurality of tools placed within the tool holders, a transfer track fastened to a portion of the holder, a tool clamp to hold the tool in working position in alignment with the transfer track, means adapted to engage a portion of said tool holder, and gear means for moving said first means and tool on the transfer track to and from the tool clamp.

5. In a machine tool, a micrometer screw provided with a feeding thread and a measuring thread, one superimposed upon the other, a female thread to engage the feeding thread, a female thread to engage the measuring thread, and means to engage the female threads only at alternate times.

6. In a machine tool, a micrometer screw provided with a feeding thread and a measuring thread at different longitudinal positions on the screw cylinder, a female thread to engage the feeding thread, a female thread to engage the measuring thread, and means to engage the female threads only at alternate times.

7. In a machine tool attachment, a rotatable carrier for a plurality of tools, a transfer track, a movable tool clamp, all provided with dovetail tracks, tools which will slidably engage said tracks, flaring ends on the dovetail track of the transfer track adjacent the tool clamp, a bar pivotally fastened to the tool clamp and slidably mounted on the transfer track and tool carrier base, means for selecting a desired tool in the carrier, means for moving the tool in the dovetail tracks to and from the tool clamp.

8. In a machine tool attachment, a combination of a carrier for a plurality of tools, means for transposing a selected tool from the said carrier to working position, a micrometer screw for regulating the working of said tool, a portion of said screw adapted to be used for feeding, and another portion of said screw adapted to be used for measuring to the end that the latter portion may retain its accuracy.

9. In a machine tool, a tool clamp, tools adapted to be worked in said clamp, a micrometer screw for regulating the motion of said clamp, a portion of said screw adapted to be used for feeding, and another portion of said screw adapted to be used for measuring to the end that the latter portion may retain its accuracy, and means for indicating on said tools the micrometer setting necessary to effect a given operation with said tools.

10. In a machine tool attachment, a combination of a carrier for a plurality of tools, means for transposing a selected tool from the said carrier to working position, a micrometer screw for regulating the working of said tool, a portion of said screw adapted to be used for feeding, another portion of said screw adapted to be used for measuring to the end that the latter portion may retain its accuracy, and means for indicating on said tools the micrometer setting necessary to effect a given operation with said tools.

11. In a machine tool attachment, a movable tool carrier, a plurality of tools placed within the carrier, a tool clamp to hold the tool in working position, a transfer track positioned between the carrier and the tool clamp, means adapted to engage a portion of a tool, and a second means for shifting said first means and the tool on the transfer track to and from the tool clamp.

12. In a machine tool attachment, a combination of a carrier for a plurality of tools, means for transposing a selected tool from the carrier to working position, a micrometer screw for regulating the working of said tool, a portion of said screw adapted to be used for feeding and another portion of said screw adapted to be used for measuring to the end that the latter portion may retain its accuracy, and indexing means to designate the setting of said micrometer screw necessary to effect a particular operation with a particular tool.

13. In a machine tool attachment, a combination of a carrier for a plurality of tools, a movable tool clamp to hold the tool in its working position, a transfer track intermediate said carrier and said clamp, said transfer track being adapted to receive the tool from the carrier and guide it to the clamp, means for selecting the desired tool and means for ejecting the tool from the carrier and forcing it along the track to the clamp.

14. In a machine tool, a micrometer provided with screw means for adjustment thereof, said screw means comprising a male member having a feeding thread and a measuring thread, one superimposed upon the other, a female thread to engage the feeding thread, a female thread to engage the measuring thread and means to engage the female threads only at alternate times.

15. In a machine tool, a micrometer provided with screw means for adjustment thereof, said screw means comprising a male member having a feeding thread and a measuring thread at different longitudinal positions thereon, a female thread to engage the feeding thread, a female thread to engage the measuring thread and means to engage the female threads only at alternate times.

CONRAD M. CONRADSON.